Dec. 20, 1955     A. BLUMER     2,727,277

HEATER CYLINDER ON INJECTION MOLDING MACHINES

Filed Nov. 23, 1951

INVENTOR:
Armin Blumer
By
Thenderoth, Lind & Ponack
Attorneys

United States Patent Office 2,727,277
Patented Dec. 20, 1955

2,727,277

HEATED CYLINDER ON INJECTION MOLDING MACHINES

Armin Blumer, Netstal, Switzerland, assignor to Maschinenfabrik & Giesserei Netstal A. G., Netstal, Switzerland Application November 23, 1951, Serial No. 257,721

Claims priority, application Switzerland April 13, 1951

2 Claims. (Cl. 18—30)

My present invention relates to improvements in the heatable head of injection molding machines for thermoplastic materials, which comprises an inclosed liquifier; and the objects of my improvement are to ensure a high rate of heat transfer from the liquifier to the material to be molded, and to reduce to a minimum the resistance offered to the material passing through the head. To such end, the head as disclosed herein comprises a heatable cylinder having a liquifier which in an axial plane is divided in two parts and of which the hollow space is subdivided into a plurality of longitudinal passages by longitudinal fins of the two liquifier parts, which fins extend at right angles to the dividing plane.

By virtue of such arrangement the thermoplastic material supplied to the liquifier is heated and liquified at substantially equal rates both in the marginal and central zones of the hollow space. Such arrangement substantially increases the production rate of the head. Tests have shown that the liquifying rate in the head disclosed by my present invention is higher than in known heads comprising torpedo-type enclosures.

One form of my present invention is shown in the accompanying drawing in which.

Figure 1:
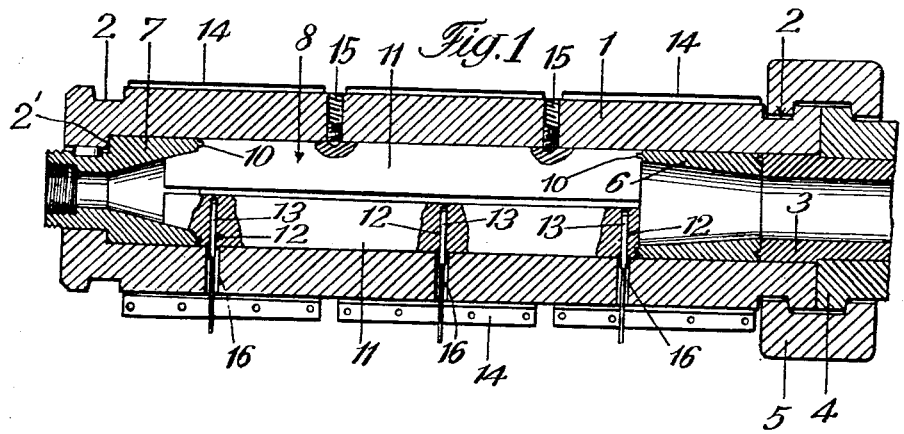
Fig. 1 is an axial section through the head or heated cylinder.

The heatable outer connecting and supporting cylinder 1 at both ends is provided with an exterior circumferential groove 2. The cylinder through its rear end portion is mounted on a bushing 3 of an outlet spout 4 of the injection machine proper (not shown) and is detachably secured to said spout by means of a plural-part joining sleeve 5. A two-part liquifier 8 is located between an inlet bushing 6 disposed adjacent the bushing 3 in the hollow cylinder space on one hand and a nozzle 7 inserted in the cylinder front end portion on the other hand. The outer cylinder 1 is provided with an inner shoulder 2' opposite the outer circumferential groove 2, which shoulder accommodates the axial pressure due to the thrust of the thermoplastic material in the liquifier nozzle 7 which nozzle 7 bears against shoulder 2' and as shown in Fig. 1. The nozzle 7 takes up the axial forces from the liquifier 8 and transmits the same by abutting against said inner shoulders 2' of the cylinder 1.

The liquifier 8 is divided in an axial plane, the two half portions being interconnected by means of longitudinal keys 9 located in key-ways of the abutting longitudinal faces of said portions. The end faces of the liquifier 8 are so shaped as to form, in combination with the abutting end faces of nozzle 7 and bushing 6, labyrinth seals 10.

Figure 2:
Fig. 2 shows an inside view of one half portion of the enclosed liquifier.

The hollow space of the liquifier 8 through longitudinal fins 11 of the two liquifier half portions, which fins extend normal to the plane of division, is subdivided into a plurality of channels which intercommunicate through a channel extending along the plane of division. As shown in Figs. 1 and 2, the three central thicker longitudinal fins 11 of each liquifier half portion are extended, on the side adjacent the nozzle 7, beyond the end faces of said two portions.

Figure 3:
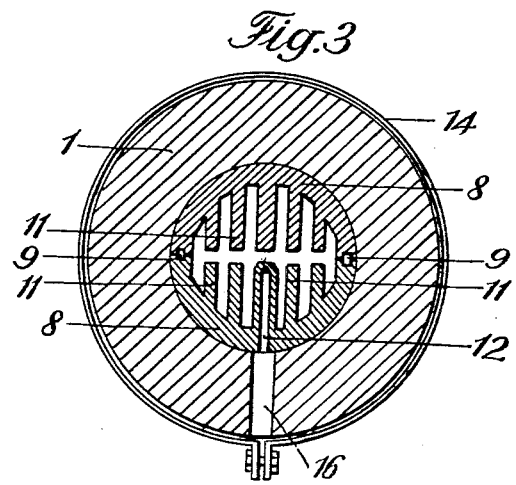
Fig. 3 shows, in a larger scale, a cross-section through the head.

The fin extensions projecting into nozzle 7 are fitted to the conically tapered inside wall thereof. The central fin 11 of the lower liquifier half portion 8 (Figs. 1 and 3) comprises, at three points spaced longitudinally thereof, radial bores 12 extending to close proximity with the end faces thereof and serving for accommodation of temperature feelers 13 (Fig. 1). The bores 12 are in alignment with the radial bores 16 in the wall of cylinder 1, through which latter bores the feelers 13 may be inserted into the bores 12.

The feelers 13 may be connected to conventional temperature measuring means. The cylinder 1 is surrounded by juxtaposed electrically-heatable hoops 14 between which are disposed threaded radial bores 15 in the wall of cylinder 1. Grub screws inserted in the bores 15 locate and secure the liquifier 8 against rotation. The said bores 15 may receive screw means (not shown) for suspending or supporting the injection head shown.

When using the injection head, the two half portions of the liquifier 8 are pressed against the heated cylinder wall through the high pressure of the thermoplastic material to be squirted from the head shown, which ensures a good heat transfer from the cylinder 1 to the liquifier 8 containing the material to be liquified. Since the pressure acts radially on the keys 9, the two half portions of liquifier 8 are tightly interengaged. Owing to the subdivision of the hollow space of the liquifier through the fins 11, a relatively large heat transfer area is provided, and the formation in the material of a quickly-liquifying external zone and of an internal or core zone which liquifies less quickly is avoided. The temperature feelers which project substantially to the center of the hollow space of the liquifier, permit to positively measure the temperature, since they do not merely measure marginal values as in the case of conventional torpedo enclosures of known heads having a cylindrical internal chamber.

When it is desired to clean the head described, the sleeve 5 is slacked and the cylinder 1 is joined to the spout 4 in reversed relation, i. e. through its forward end. The nozzle 7 and the liquifier 8 then may be ejected from the cylinder 1 by means of the hydraulic operating plunger of the injection molding machine. The operation of cleaning the head thus is very simple.

What I claim as new and desire to secure by Letters Patent is:

1. In a head on an injection molding machine for thermoplastic materials, comprising a heatable outer connecting and supporting cylinder, a cylindrical hollow thin walled liquefier removably fixed in the bore of said cylinder, said liquefier being divided into two parts by an axial plane, parallel side longitudinal fins on the inner wall of said liquefier, standing at right angles to the plane of division and defining a plurality of longitudinal channels of approximately the same width throughout, and having shoulders provided on the outer cylinder to accommodate the axial pressure applied to the liquefier by the thermoplastic material contained therein, a radial longitudinal fin of one liquefier half portion being provided with a plurality of longitudinally spaced radial bores which are open to the outside and which are aligned with continuous bores in the cylinder wall and serve for accommodating temperature feelers, the two liquefier half portions being interconnected through longitudinal keys which are engaged in recesses of the longitudinal abutting faces of the two half portions.

2. In a head on an injection molding machine as set forth in claim 1 wherein said cylinder is provided with similar portions at both ends.

References Cited in the file of this patent

UNITED STATES PATENTS

| | | |
|---|---|---|
| 2,057,945 | Gastrow | Oct. 20, 1936 |
| 2,174,319 | Gastrow | Sept. 26, 1939 |
| 2,253,460 | Hempel | Aug. 19, 1941 |
| 2,356,634 | Von Opel | Aug. 22, 1944 |